(12) United States Patent
Sato

(10) Patent No.: US 6,836,739 B2
(45) Date of Patent: Dec. 28, 2004

(54) FREQUENCY INTERPOLATING DEVICE AND FREQUENCY INTERPOLATING METHOD

(75) Inventor: Yasushi Sato, Nagareyama (JP)

(73) Assignee: Kabushiki Kaisha Kenwood, Tokyo (JP)

(*) Notice: Subject to any disclaimer, the term of this patent is extended or adjusted under 35 U.S.C. 154(b) by 54 days.

(21) Appl. No.: 10/296,167
(22) PCT Filed: Jun. 12, 2001
(86) PCT No.: PCT/JP01/04955
§ 371 (c)(1), (2), (4) Date: Nov. 22, 2002
(87) PCT Pub. No.: WO01/97212
PCT Pub. Date: Dec. 20, 2001

(65) Prior Publication Data
US 2003/0125889 A1 Jul. 3, 2003

(30) Foreign Application Priority Data
Jun. 14, 2000 (JP) .......................... 2000-178569
Aug. 29, 2000 (JP) .......................... 2000-259745

(51) Int. Cl.$^7$ ............................................ G06F 13/00
(52) U.S. Cl. .............................. 702/76; 702/73; 702/74; 702/75; 702/179
(58) Field of Search ............................. 702/64, 66, 75, 702/76, 176, 179, 188, 32, 38; 385/31; 342/383; 375/130, 140; 704/221

(56) References Cited

U.S. PATENT DOCUMENTS

| | | | |
|---|---|---|---|
| 6,115,684 A | 9/2000 | Kawahara et al. | 704/203 |
| 6,157,619 A * | 12/2000 | Ozluturk et al. | 370/252 |
| 6,381,559 B1 * | 4/2002 | Huang | 702/194 |
| 6,697,350 B2 * | 2/2004 | Lomp | 370/342 |
| 2003/0033094 A1 * | 2/2003 | Huang | 702/39 |

FOREIGN PATENT DOCUMENTS

| | | |
|---|---|---|
| EP | 1054400 | 11/2000 |
| JP | 06-110455 | 4/1994 |
| JP | 06-301383 | 10/1994 |
| JP | 09-244694 | 9/1997 |
| JP | 09-258787 | 10/1997 |
| JP | 10-097287 | 4/1998 |
| JP | 2000-330599 | 11/2000 |

OTHER PUBLICATIONS

International Search Report dated Aug. 30, 2001.
English Translation International Preliminary Examination Report dated Dec. 27, 2001.

* cited by examiner

Primary Examiner—Marc S. Hoff
Assistant Examiner—Felix Suarez
(74) Attorney, Agent, or Firm—Eric J. Robinson; Robinson Intellectual Property Law Office, P.C.

(57) ABSTRACT

The spectrum of a PCM signal is divided into bands. Combinations of a reference band inclusive of a highest frequency band and another band, one of the reference band and other band being normalized, are checked to identify a combination having a highest spectrum distribution correlation. The spectrum having the same distribution as the spectrum distribution of the reference band contained in the identified combination is scaled along an envelope function and added to a higher frequency side than the reference band to generate an output signal. A presence/absence of high frequency components of a PCM signal is detected. Only if there are high frequency components, the spectrum components are added to generate an output signal. It is therefore possible to recover a signal approximate to the original signal from either an original signal with the spectrum components in some bands being suppressed or a signal representative of an original signal containing no spectrum components in the bands or from a signal combining these two signals.

20 Claims, 8 Drawing Sheets

FREQUENCY INTERPOLATING DEVICE AND FREQUENCY INTERPOLATING METHOD

TECHNICAL FIELD

The present invention relates to a frequency interpolating device and a frequency interpolating method capable of improving spectrum distribution of a band-limited signal.

BACKGROUND ART

Distribution of data of the MPEG1 audio layer 3 (MP3) format and distribution of music and the like by frequency modulation (FM) broadcast, television sound multiplex broadcast and other methods are prevailing nowadays. These methods generally eliminate frequency components of about 15 kHz or higher of music and the like in order to avoid an increase in data amount and an expansion of an occupied band width to be caused by an excessively broad band.

Music and the like whose frequency components at a predetermined frequency or higher are removed have generally a poor sound quality. Signals substituting the removed frequency components are added to improve the sound quality, as disclosed in JP Laid-Open Gazette No. 7-93900.

According to the approach disclosed in JP Laid-Open Gazette No. 7-93900, a PCM digital audio signal is passed through a low pass filter and its output signal is multiplied by a signal containing absolute value components of the output signal to generate distortion.

An audio signal reproducing apparatus disclosed in JP Laid-Open Gazette No. 7-93900 generates harmonic waves by distorting the waveform of an output audio signal with a limitter circuit and the like. It is indefinite that such harmonic waves are approximate to those contained in the original audio signal.

The invention has been made to solve the above-described problem associated with prior art. A first object of the present invention is to provide a frequency interpolating device and a frequency interpolating method capable of recovering a signal approximate to an original signal from a predetermined conversion signal obtained from a band-limited signal of the original signal, particularly a frequency interpolating device and a frequency interpolating method capable of recovering an audio signal of a high sound quality.

According to the prior art, even if the frequency components at a predetermined frequency or higher are not necessary to be removed, an audio signal of music or the like is compressed into the MP3 format or the like so that the band of the audio signal is generally limited.

Even if original sounds or the like represented by a PCM digital audio signal have no frequency components higher than the pass band width of a low pass filter, a conventional device adds unnecessary high frequency components not contained in the original sounds or the like. The quality of an output audio signal is degraded more than it is passed through a low pass filter and additional signal processing is not performed.

Under such circumstances, a second object of the invention is to provide a frequency interpolating device and a frequency interpolating method capable of recovering a signal approximate to an original signal even from a signal mixed with a signal representative of the original signal whose spectrum components in some bands were removed and a signal representative of the original signal which has no spectrum components in these bands.

DISCLOSURE OF THE INVENTION

In order to achieve the first object of the invention, in a frequency interpolating device for receiving an input signal of an original signal whose frequency components in a particular frequency band was suppressed, approximately recovering suppressed frequency components and reproducing a signal approximate to the original signal, short period spectra are obtained from a frequency band having frequency components not suppressed, a short period spectrum in the suppressed frequency band are estimated by paying attention to repetition of a spectrum pattern at a predetermined frequency interval, and in accordance with this estimation, a signal containing the frequency components in the suppressed frequency band is synthesized and added to the input signal. More specifically, in the frequency interpolating device of the invention, the repetition of the spectrum pattern is judged from a correlation coefficient between a spectrum pattern in a first frequency band having a predetermined band width and frequency components not suppressed near the suppressed frequency band and a spectrum pattern in a second frequency band adjacent to the first frequency band having the predetermined band width.

If the spectrum pattern in the first frequency band and the spectrum pattern in the second frequency band have a high correlation coefficient, a replica of the spectrum pattern having a correlation is coupled to interpolate the frequency components in the suppressed frequency band.

With this frequency interpolating device, a portion of a spectrum of a signal to be interpolated having a high spectrum distribution correlation is added along an envelope line to the high frequency side of the signal to be interpolated to thereby expand the band. The added spectrum can be regarded as some harmonic components of the original spectrum. Therefore, if the signal to be interpolated has a limited band, the signal with the expanded band is approximate to the original signal before the band limitation. If the signal to be interpolated is an audio signal, the audio signal of a high sound quality can be recovered from the signal with the expanded band.

In the frequency interpolating device of the invention, the intensities of the frequency components to be synthesized are determined from a spectrum envelope of the suppressed frequency band estimated from a spectrum envelope of the frequency band not suppressed. Preferably, the particular frequency band is a high frequency band, and an upper limit frequency of the first or second frequency band is a lower limit frequency of a suppressed high frequency band.

If the interpolation band contains the highest frequency spectrum of the signal to be interpolated, there is a high possibility that the interpolation band itself is some harmonic components of the original spectrum. The signal with the expanded band is more approximate to the original signal before band limitation.

According to another aspect achieving the first object of the invention, the frequency interpolating device comprises: spectrum generating means for generating short period spectra of the input signal; spectrum pattern deriving means for deriving short period spectrum patterns having a correlation in adjacent frequency bands having a same band width; spectrum envelope deriving means for deriving spectrum envelope information in the band whose frequency components are not suppressed; means responsive to the spectrum pattern deriving means and the spectrum envelope driving means for synthesizing a frequency spectrum signal for interpolating the suppressed frequency band; and means for adding the synthesized spectrum signal to the input signal. In this device, the synthesized spectrum signal contains the frequency components in the suppressed frequency band, the derived spectrum pattern and the level determined by the spectrum envelope information. Typically, the input signal is a PCM signal obtained by sampling and quantizing an analog audio signal.

According to another aspect of the invention, there is provided a frequency interpolating method of receiving an input signal of an original signal whose frequency components in a particular frequency band was suppressed, approximately recovering suppressed frequency components and reproducing a signal approximate to the original signal, wherein: short period spectra are obtained from a frequency band having frequency components not suppressed; a short period spectrum of the frequency components in the suppressed frequency band is estimated in accordance with repetition of a spectrum pattern in the frequency band having frequency components not suppressed, and the estimated short period spectrum pattern is synthesized and added to the input signal.

In order to achieve the second object of the invention, in the frequency interpolating device of the invention and in a frequency interpolating system for receiving an input signal of an original signal whose frequency components in a particular frequency band was suppressed, approximately recovering suppressed frequency components and reproducing a signal approximate to the original signal, the device and system comprise: means for judging whether the particular frequency band of the original signal contains frequency components having a predetermined level or higher and generating identification data representative of a presence/absence of the frequency components having the predetermined level or higher; signal conversion means for suppressing the frequency components of the original signal in the particular frequency band and subjecting the original signal to a predetermined signal conversion process; means for superposing the identification data upon the converted signal and transmitting the identification data and the converted data; judging means for receiving a transmitted signal, checking the identification data contained in the signal, and judging a presence/absence of the frequency components in the particular frequency band; branch control means for controlling to output the received signal to an external if said judging means judges that the particular frequency band does not contain the frequency components and to input the received signal to succeeding signal processing means if the judging means judges that the particular frequency band contains the frequency components; and signal processing means responsive to the received signal from the control means for performing an inverse conversion process of the predetermined signal conversion process and an interpolation process of approximately synthesizing and adding the frequency components in the suppressed frequency band. More specifically, the predetermined signal conversion process is a data compression process and the inverse conversion process to be executed by said signal processing means is a data decompression process. The interpolation process to be executed by said signal processing means includes (i) a short period spectrum analysis process, (ii) a process of deriving short period spectrum patterns in adjacent frequency bands having a correlation, and (iii) a process of deriving spectrum envelope information.

With the frequency interpolating system, the identification data is generated which is representative of whether the spectrum of the original signal is distributed to the suppressed frequency band. If the identification data indicates an existence of a spectrum in the suppressed frequency band, a portion of the spectrum with a high correlation of the signal to be interpolated is added along an envelope to the high frequency side of the signal to be interpolated to thereby expand the band. The added spectrum can be regarded as some harmonic components of the original spectrum. Therefore, if the signal to be interpolated has a limited band, the signal with the expanded band is approximate to the original signal before the band limitation. If the identification data indicates no existence of the spectrum in the interpolation band, the signal to be interpolated is output without spectrum addition.

As a result, even if the received signal is a signal to be interpolated having the suppressed spectrum components in some bands of an original signal, or a signal representative of the original signal which does not contain the spectrum components in the bands, a signal approximate to the original signal can be recovered. If the signal is an audio signal, the audio signal of a high sound quality can be recovered.

The above-described frequency interpolating system has an integrated arrangement of a signal transmission side (including an encoder) and a signal receiving side (including a decoder). The invention may be embodied only by the reception side (decoder side). In this case, a frequency interpolating device for receiving an input signal of an original signal whose frequency components in a particular frequency band was suppressed, approximately recovering suppressed frequency components and reproducing a signal approximate to the original signal, comprises: means for receiving a first signal obtained by subjecting the original signal whose signal components in the particular frequency band were suppressed to a predetermined signal conversion process and a second signal superposed upon the first signal of identification data representative of whether the particular frequency band of the original signal contains the frequency components having a predetermined level or higher; judging means for checking the identification data contained in the received signal and judging a presence/absence of the frequency components in the particular frequency band; branch control means for controlling to output the received signal to each part if the judging means judges that the particular frequency band does not contain the frequency components and to input the received signal to succeeding signal processing means if the judging means judges that the particular frequency band contains the frequency components; and signal processing means responsive to the received signal from the branch control means for performing an inverse conversion process of the predetermined signal conversion process and an interpolation process of approximately synthesizing and adding the frequency components in the suppressed frequency band.

Similar to the frequency interpolating device, in order to achieve the first object of the invention, there is provided a frequency interpolating method which comprises: a step of judging whether the particular frequency band of the original signal contains frequency components having a predetermined level or higher and generating identification data representative of a presence/absence of the frequency components having the predetermined level or higher; a step of suppressing the frequency components of the original signal in the particular frequency band and subjecting the original signal to a predetermined signal conversion process; a step of superposing the identification data upon the converted signal and transmitting the identification data and the converted data; a judging step of receiving a transmitted signal, checking the identification data contained in the signal, and judging a presence/absence of the frequency components in the particular frequency band; a branch control step of controlling to output the received signal to an external if the judging step judges that the particular frequency band does not contain the frequency components and to input the received signal to a succeeding signal processing step only if the judging step judges that the particular frequency band contains the frequency components; and a signal processing step, responsive to the received signal from the branch control step, of performing an inverse conversion process of the predetermined signal conversion process and an interpolation process of approximately synthesizing and adding the frequency components in the suppressed frequency band.

EMBODIMENTS OF THE INVENTION

Embodiments of the invention will be described in detail with reference to the accompanying drawings.

(First Embodiment)

Figure 1:
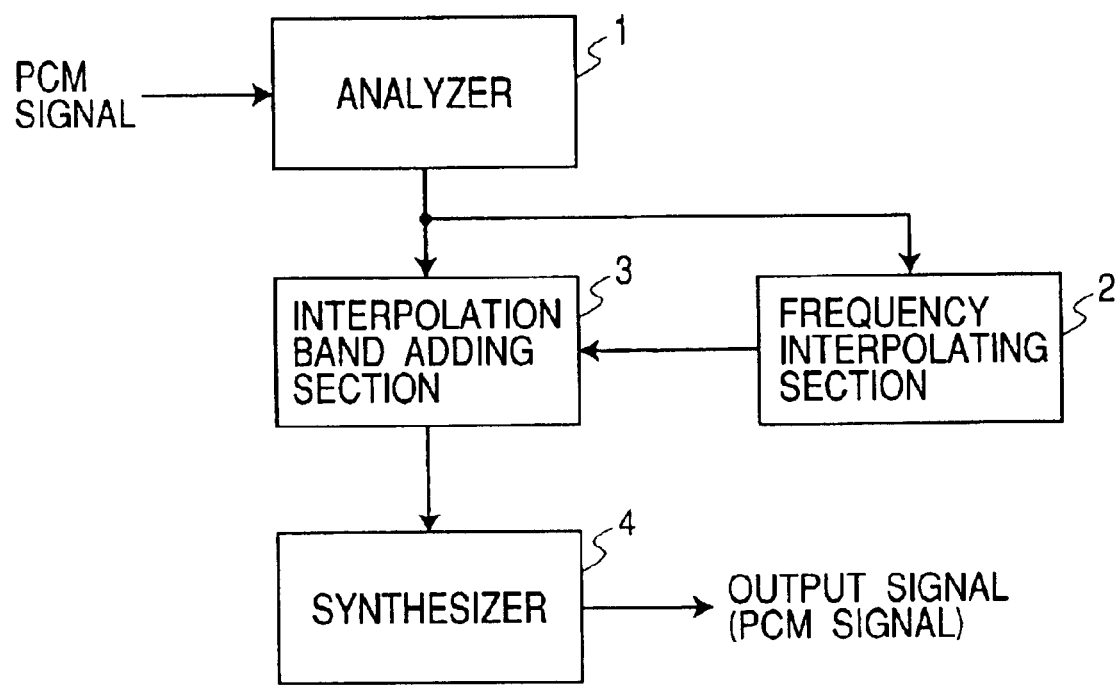
FIG. 1 is a diagram showing the structure of a frequency interpolating device according to a first embodiment of the invention.

FIG. 1 is a diagram showing the structure of a frequency interpolating device according to a first embodiment of the invention.

As shown, this frequency interpolating device is constituted of an analyzer 1, a frequency interpolating section 2, an interpolation band adding section 3, and a synthesizer 4.

Figure 2:
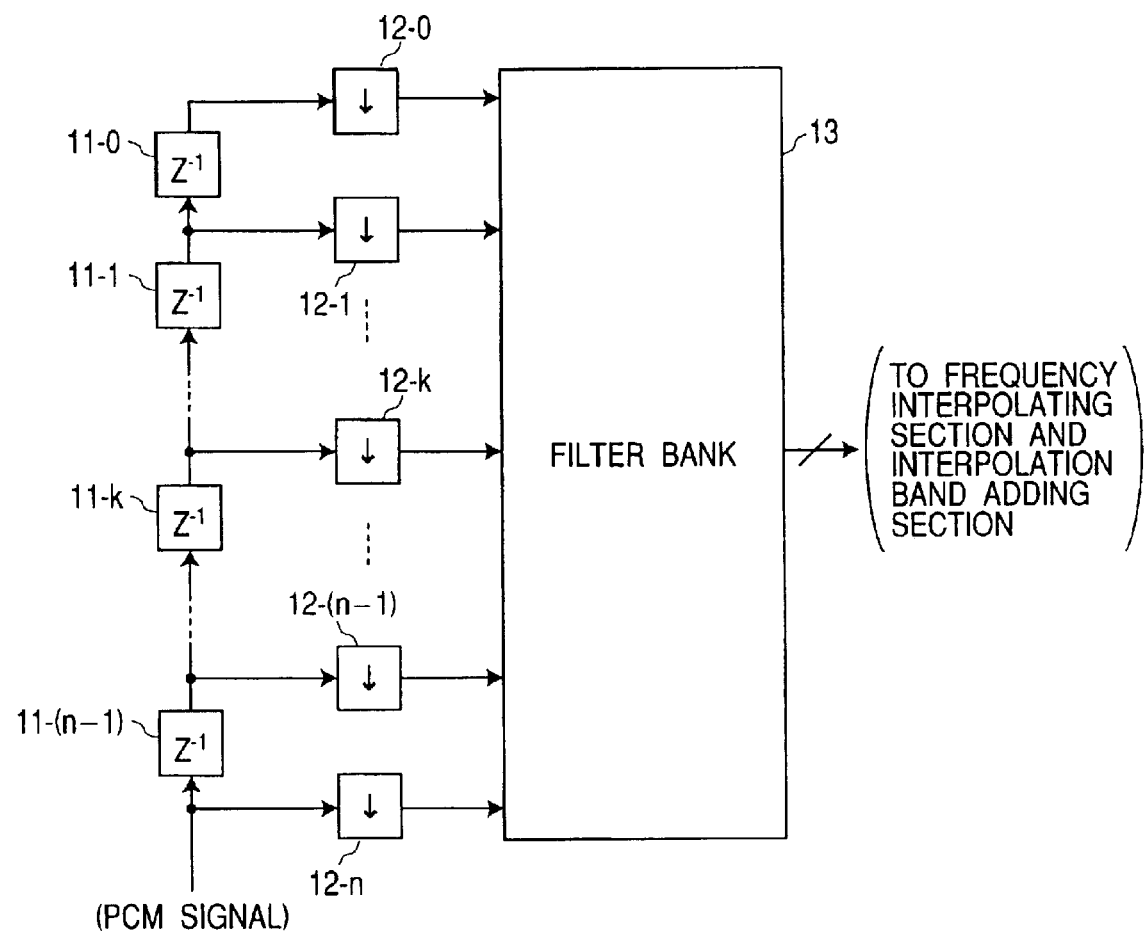
FIG. 2 is a diagram showing the structure of an analyzer.

As shown in FIG. 2, the analyzer 1 is constituted of n delay units 11-0 to 11-(n−1), (n+1) samplers 12-0 to 12-n and a filter bank 13 (where n is an integer of any of 1 or larger).

Each of the delay units 11-0 and 11-(n−1) outputs an input signal by delaying it by one sampling period. A signal output from a delay unit 11-k is supplied to a sampler 12-k (where k is an integer of any of 0 to (n−1)). A delay unit 11-j is supplied with a signal output from a delay unit 11-(j+1) (where j is an integer of any of 0 to (n−2)). The delay unit 11-(n−1) is supplied with a pulse code modulation (PCM) signal which is to be subjected to frequency interpolation by the frequency interpolating device.

Therefore, the delay unit 11-k outputs a PCM signal supplied from the delay unit 11-(n−1) by delaying it by (n−k) sampling periods of the PCM signal.

A PCM signal is a signal obtained by sampling and quantizing, i.e., so-called PCM modulating, an analog audio signal such as a voice signal. The spectrum distribution of an audio signal represented by a PCM signal shows that the frequency components of an original audio signal shown in FIG. 3(a) higher than a predetermined frequency (14 kHz in the example shown in FIG. 3(b)) are removed.

Each of the samplers 12-0 to 12-n samples a supplied signal at a sampling frequency of 1/(n+1)-th the sampling frequency of the PCM signal to be subjected to frequency interpolation, and supplies the sampled signal to the filter bank 13.

As described earlier, the sampler 12-k is supplied with an output of the delay unit 11-k. The sampler 12-n is supplied with the PCM signal to be subjected to frequency interpolation by the frequency interpolating device, substantially at the same time when the PCM signal is applied to the delay unit 11-(n−1).

The filter bank 13 is constituted of a digital signal processor (DSP), a central processing unit (CPU) and the like.

As described earlier, the filter bank 13 is supplied with outputs of the samplers 12-1 to 12-n.

The filter bank 13 generates first to (n+1)-th (n+1) signals representative of short span spectrum distributions of the input signals, by using a poly-phase filter, discrete cosine transform (DCT), lapped orthogonal transform (LOT), modulated lapped transform (MLT), a quadrature mirror filter (QMF), extended lapped transform (ELT) or the like. Namely, the filter bank 13 converts a time sequential signal into a frequency spectrum signal. The generated (n+1) signals are supplied to the frequency interpolating section 2 and interpolation band adding section 3.

It is assumed that the p-th signal generated by the filter band 13 is a signal representative of a spectrum distribution in the p-th lowest frequency band among the bands obtained by dividing by (n+1) the short span spectrum distributions output from the samplers 12-0 to 12-n (where p is an integer of any of 1 to (n+1)).

The frequency interpolating section 2 is constituted of a DSP, a CPU and the like. Upon reception of the (n+1) signals representative of the spectrum distributions of the (n+1) bands from the filter bank 13, the frequency interpolating unit 2 performs, for example, the following processes (1) to (5) to determine a reference band to be used as an interpolation band.

(1) In order to determine the interpolation band, the frequency interpolating section 2 first identifies a band (reference band) formed by coupling consecutive q (q is an integer in the range from 1 or larger to n or smaller) higher frequency bands among the bands represented by the signals supplied from the filter bank 13. A mean square value X of the spectrum components of the reference band is calculated. The band higher than the highest frequency of the reference band is defined as a band which does not substantially contain the spectrum of an audio signal represented by the PCM signal supplied to the analyzer 1.

(2) The frequency interpolating section 2 identifies a band (comparison band) formed by coupling consecutive q (q is an integer in the range from 1 or larger to n or smaller) higher frequency bands excluding the band having the highest frequency among the bands represented by the signals supplied from the filter bank 13. A mean square value Y of the spectrum components of the comparison band is calculated.

(3) By using the mean square values of the spectrum components of the reference band and comparison band, the values of the spectrum components of the comparison band are normalized. For example, a ratio Y/X of the mean square value of the spectrum components of the comparison band to the mean square value of the reference band is calculated, and this ratio is multiplied by respective spectrum components of the comparison band. A set of obtained products represents a spectrum distribution of the normalized comparison band.

(4) A correlation coefficient between the spectrum distributions of the reference band and normalized comparison band is calculated by a least square method or the like.

In this case, the correlation coefficient is calculated by the frequency interpolating section 2 on the assumption that the frequency of each spectrum of the comparison band is an original frequency added with a difference between the lowest frequencies of the reference band and comparison band.

(5) The frequency interpolating section 2 calculates the correlation coefficients by executing the processes (1) to (4) for all available values of q and for all available combinations of the reference band and comparison band. Of these combinations, the combination having a highest correlation coefficient is identified. Identification information of the reference band contained in the identified combination is supplied to the interpolation band adding section 3.

The interpolation band adding section 3 is constituted of a DSP, a CPU and the like. Upon reception of the (n+1) signals representative of the spectrum distributions of the (n+1) bands from the filter bank 13, the interpolation band adding section 3 identifies a function representative of an envelope of the spectrum distribution of each band. By performing regression calculations or the like by using the identified function, an estimate value of a mean square value of the spectrum components to be contained essentially in the interpolation band which is a band on the higher frequency band side than the highest frequency band (although this interpolation band was suppressed by a band limiting process).

A single interpolation band or a plurality of interpolation bands may be used. The width of each interpolation band is assumed to be equal to the width of the reference band identified by the information supplied from the frequency interpolating section 2. If there are a plurality of interpolation bands, these bands are continuous without any overlap and the interpolation band adding section 3 calculates the estimate value of a mean square value of the spectrum components of each interpolation band.

Upon reception of the information for identifying the reference band from the frequency interpolating section 2, the interpolation band adding section 3 obtains the spectrum distribution of the interpolation band through scaling of the identified reference band.

Namely, the interpolation band adding section 3 first calculates the mean square value of the spectrum components of the identified reference band. Then, a ratio of the estimate value of the spectrum components of the interpolation band to the calculated mean square value of the spectrum components of the reference band is calculated. This ratio is multiplied by each of the spectrum components of the reference band. A set of calculated products represents a spectrum distribution of the reference band after scaling.

The interpolation band adding section 3 generates a signal representative of the spectrum distribution of the interpolation band by considering the spectrum distribution of the reference band after scaling as the spectrum distribution of the interpolation band. The generated signal as wall as the signals supplied from the filter bank 13 is supplied to the synthesizer 4.

Namely, the interpolation band adding section 3 supplies the synthesizer 4 with a spectrum distribution (spectrum distribution after interpolation) obtained by adding spectrum components of the interpolation band to the spectrum of the original PCM signal.

If the interpolation band adding section 3 considers the spectrum distribution of the reference band after scaling as the spectrum distribution of the r-th interpolation band as counted from the lower frequency side, it is assumed that the frequency of each spectrum of the reference band after scaling is an original frequency added with a highest frequency of the reference band and a value (r−1) times the width of the interpolation band.

Figure 4:
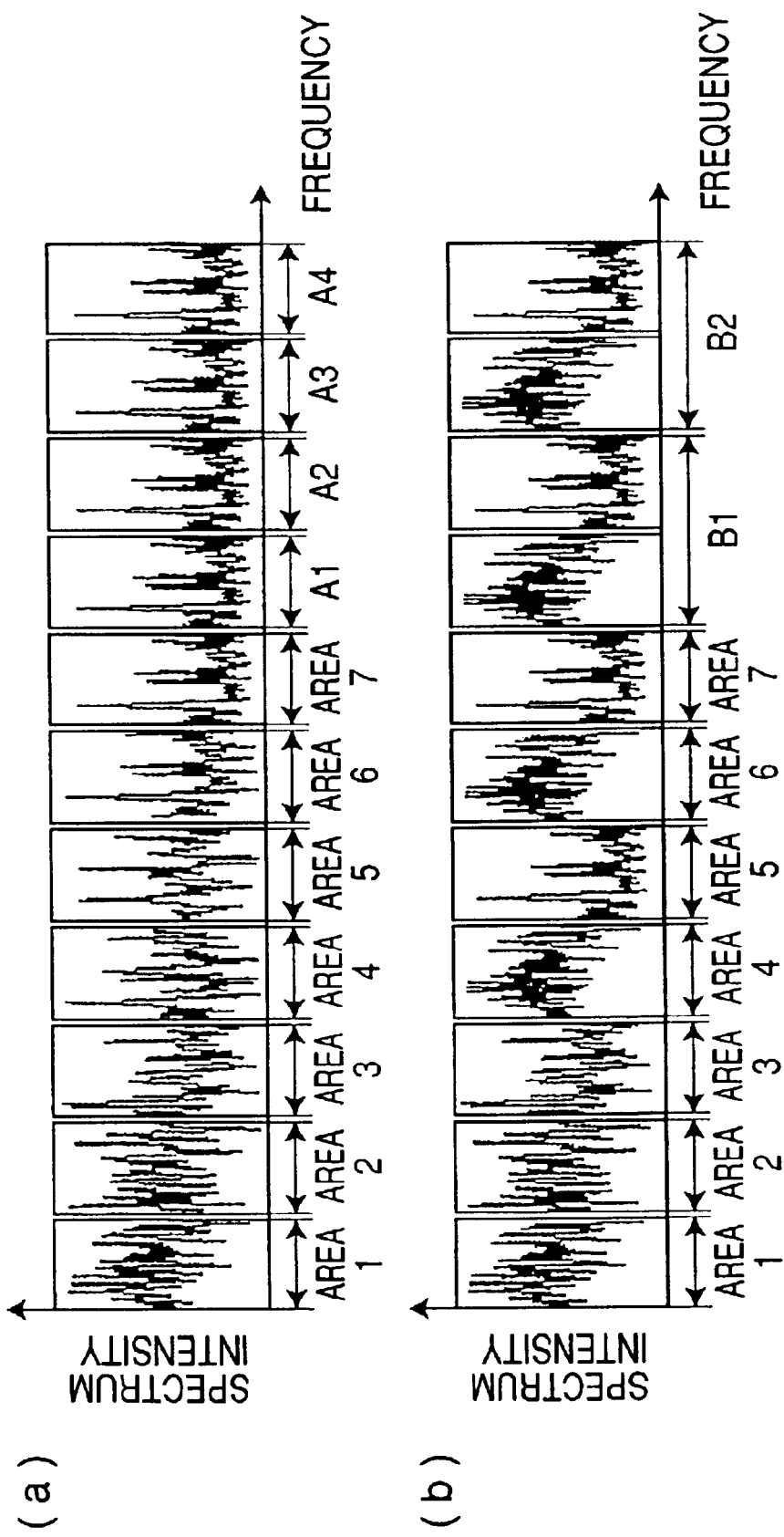
FIGS. 4(a) and 4(b) are diagrams showing examples of spectrum distributions after interpolation.

FIGS. 4(a) and 4(b) show examples of the spectrum distribution after interpolation.

In the example shown in FIG. 4(a), of seven bands (first to seventh bands) of an audio signal represented by an original PCM signal, a combination of the seventh and sixth bands has a highest correlation coefficient. Namely, spectrum patterns have a repetition of one band period. In this case, as shown in FIG. 4(a), a spectrum having substantially the same distribution as that of the seventh band which is the reference band is added to four interpolation bands A1 to A4.

In the example shown in FIG. 4(b), of seven bands of an audio signal represented by an original PCM signal, a combination of the sixth and seventh bands and the fourth and fifth bands has a highest correlation coefficient. Namely, spectrum patterns have a repetition of a two-band period. In this case, as shown in FIG. 4(b), a spectrum having substantially the same distribution as that of the reference band (a band constituted of the sixth and seventh bands) is added to two interpolation bands B1 and B2.

Figure 5:
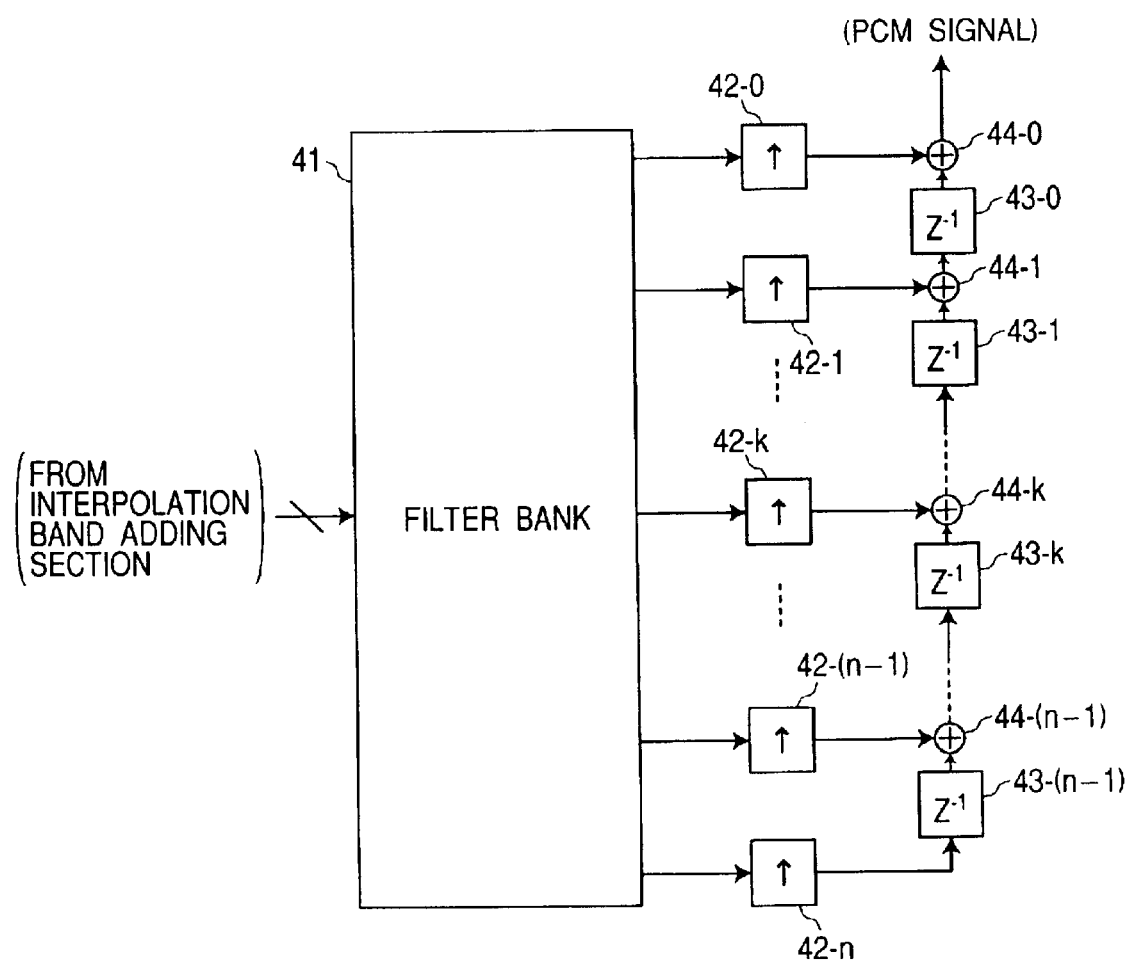
FIG. 5 is a diagram showing the structure of a synthesizer.

As shown in FIG. 5, the synthesizer 4 is constituted of a filter bank 41, (n+1) samplers 42-0 to 42-n, n delay units 43-0 to 43-(n−1) and n adders 44-0 to 44-(n−1).

The filter bank 41 is constituted of a DSP, a CPU and the like. As described earlier, the filter bank 41 is supplied with a signal representative of the spectrum distribution after interpolation output from the interpolation band adding section 3.

The filter bank 41 generates (n+1) signals representative of the values of signals having the spectrum distribution of a supplied signal and sampled at (n+1) points, by using poly-phase filters, DCT, LOT, MLT, ELT or the like (e.g., converts a spectrum signal in the frequency domain into a signal in the time domain). Of these generated (n+1) signals, a p-th signal (p is an integer of any of 1 to (n+1)) is supplied to a sampler 42-(p−1).

It is assumed that the sampling period for the values of the signals generated by the filter bank 41 is substantially equal to the sampling period of the samplers 12-1 to 12-n of the analyzer 1.

The p-th signal generated by the filer bank 41 represents the value at the p-th earliest sampling time among the values obtained by sampling at the (n+1) points and at an equal pitch the signal having the spectrum distribution representative of the signal supplied to the filter bank 41.

Each of the samplers 42-1 to 42-n converts a supplied signal into a signal having a frequency (n+1) times that of the supplied signal, and outputs a PCM signal representative of the conversion result.

As described earlier, the sampler 42-(p−1) is supplied with the p-th signal output from the filter bank 41. A sampler 42-(s−1) supplies its output signal to an adder 44-(p−1) (where s is an integer of any of 1 to n). The sampler 42-n supplies its output signal to the delay unit 43-(n−1).

Each of the delay units 43-0 to 43-(n−1) delays a supplied signal by one period and outputs it.

A delay unit 43-k supplies its output signal to an adder 44-k (where k is an integer in the range from 0 or larger to (n−1) or smaller). A delay unit 43-j is supplied with a signal output from an adder 44-(j+1) (where j is an integer in the range from 0 or larger to (n−2) or smaller). As described earlier, the delay unit 43-(n−1) is supplied with a signal output from the sampler 42-n.

Each of the adders 44-0 to 44-(n−1) outputs a signal representative of a sum of supplied two signals.

An adder 44-k is supplied with signals output from a sampler 42-k and delay unit 43-k. An adder 44-m supplies its output signal to a delay unit 43-(m−1) (where m is an integer in the range from 1 or larger to (n−1) or smaller). A signal output from the adder 44-0 is an output signal of the frequency interpolating device.

An output signal from the adder 44-0 is a PCM signal having the spectrum distribution after interpolation and obtained by sequentially outputting the signals output from the samplers 42-0, 42-1, . . . , 42-(n−1) and 42-n at substantially the same period as that of the PCM signal supplied to the analyzer 1.

Of the spectrum distribution after interpolation, the spectrum distribution of the interpolation band added by the interpolation band adding section 3 has a spectrum distribution corresponding to the spectrum distribution of the reference band contained in the combination of the reference band and comparison band having the highest spectrum distribution correlation. Therefore, the spectrum distribution of the interpolation band can be considered as harmonic components of the reference band or comparison band. An output signal from the adder 44-0 is therefore a PCM signal obtained through PCM of an audio signal simulated to the audio signal before the band limitation. By reproducing the audio signal from the output signal of the adder 44-0, the audio signal having high sound quality can be recovered.

The structure of the frequency interpolating device is not limited only to that described above.

For example, the functions of the delay units 11-0 to 11-(n−1) and 43-0 to 43-(n−1), samplers 12-0 to 12-n and 42-0 to 42-n and adders 44-0 to 44-(n−1) may be realized by DSP and CPU.

The frequency interpolating section 2 may determine the interpolation band by calculating a numerical value representative of a correlation between the reference band and comparison band instead of the correlation coefficient, in accordance with the spectrum distribution of the reference band and comparison band.

The frequency interpolating section 2 may identify a combination between the reference band and comparison band and thereafter supply the information for identifying the comparison band in the identified combination to the interpolation band adding section 3. In this case, the interpolation band adding section 3 obtains the spectrum distribution of the interpolation band through scaling of the identified comparison band.

The frequency interpolating section 2 may normalize the comparison band in the above-described process (3).

However, if the spectrum distribution of the interpolation band is obtained from the spectrum distribution of the reference band, there is a high possibility that the reference band itself is harmonic components of the comparison band because the highest frequency of the reference band contains the highest frequency of the spectrum of the original PCM signal. Therefore, if the spectrum distribution of the interpolation band is obtained from the spectrum distribution of the reference band, a signal output from the adder 44-0 becomes an audio signal more simulated to the audio signal before the band limitation than if the spectrum distribution of the interpolation band is obtained from the spectrum distribution of the comparison band.

A signal to be interpolated by the frequency interpolating device is neither limited only to a PCM signal nor it is required to be a modulated signal of an audio signal.

Although the embodiment of the invention has been described above, the frequency interpolating device of the invention may be realized by using a general computer system without using a dedicated system.

For example, a program realizing the functions of the analyzer 1, frequency interpolating section 2, interpolation band adding section 3 and synthesizer 4 may be read from a storage medium (such as CD-ROM, MO and floppy disc) and installed to realize the functions of the frequency interpolating device which executes the above-described processes.

The program may be presented on a bulletin board system (BBS) on a communication line to distribute it. A carrier may be modulated by signals representative of the program to transmit the obtained modulated wave. An apparatus received this modulated wave demodulates it to recover the program.

The above-described processes can be executed by running and executing the program under the control of an OS like other application programs.

If OS shares a portion of the processes or constitutes a portion of each constituent element of the invention, the program removing such a portion may be stored in a storage medium. Also in this case, the storage medium stores the program for executing each function or step of the computer.

The previously-described first object of the invention can be effectively achieved by the frequency interpolating device (or method) according to the first embodiment of the invention.

(Second Embodiment)

Figure 6:
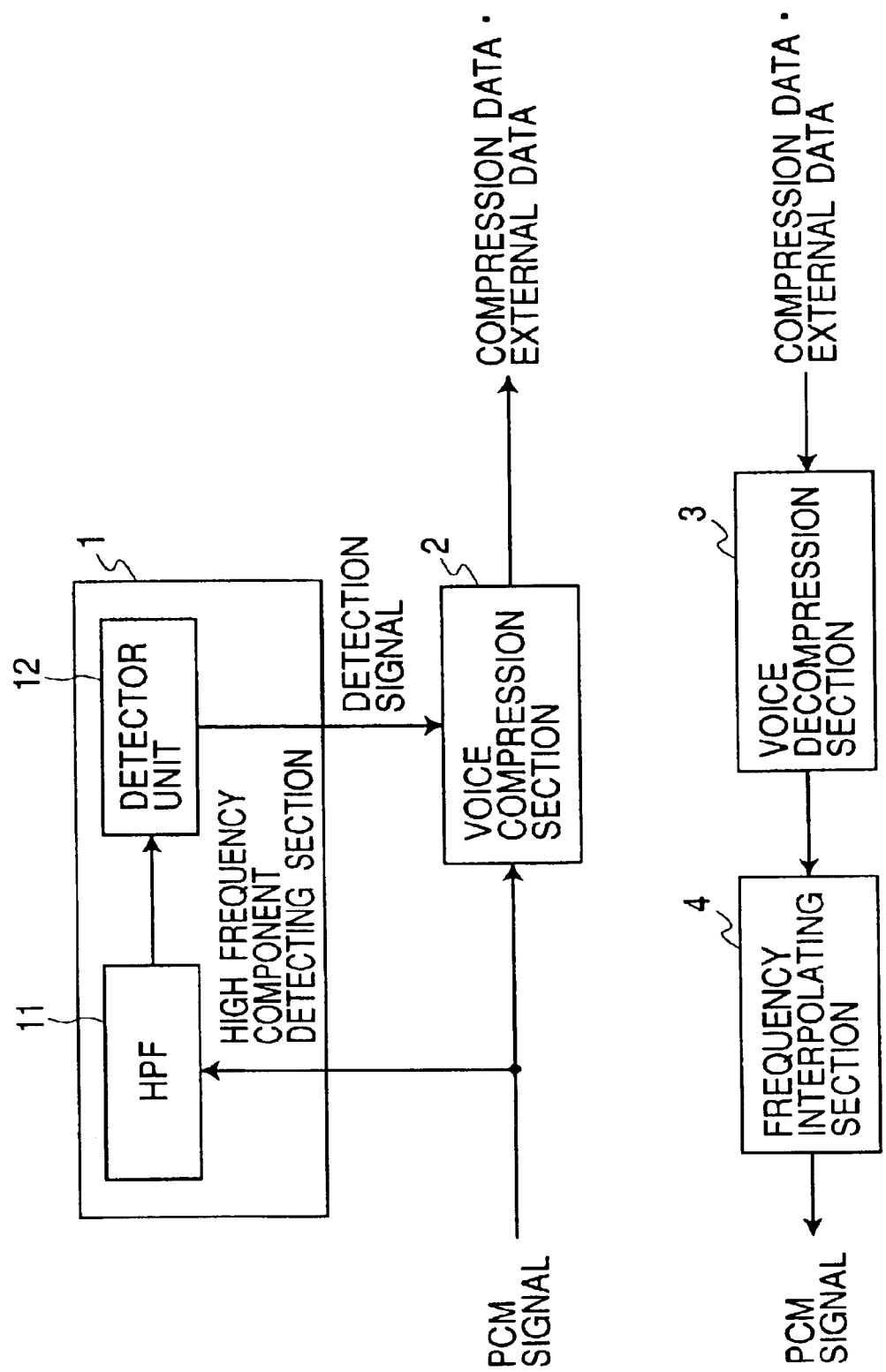
FIG. 6 is a diagram showing the structure of a frequency interpolating device according to a second embodiment of the invention.

FIG. 6 is a diagram showing the structure of a frequency interpolating device according to a second embodiment of the invention which can achieve the second object of the invention.

As shown in FIG. 6, the frequency interpolating device is constituted of a high frequency component detecting section 1, a voice compression section 2, a voice decompression section 3 and a frequency interpolating section 4.

As shown in FIG. 6, the high frequency component detecting section 1 is constituted of a high pass filter (HPF) 11 and a detector unit 12.

HPF 11 receives a PCM signal to be compressed, cuts the frequency components at a predetermined frequency or lower, and supplies the other components (high frequency components) to the detector unit 12. The PCM signal to be compressed is also supplied to the voice compression section 2.

The PCM signal to be compressed is generated from an audio signal representing a voice or the like as a change in voltage or current. The cut-off frequency of HPF 11 is set higher than the upper limit frequency of a band occupied by compression data of the PCM signal compressed by the voice compression section 2. For example, if the upper limit frequency of the band occupied by the compression data is about 14 kHz, the cut-off frequency is set to, e.g., about 16 kHz.

Upon reception of the high frequency components of the PCM signal from HPF 11, the detector unit 12 detects the high frequency components and generates a detection signal. This detection signal is supplied to the voice compression section 2 at the timing synchronous with the timing when the PCM signal to be compressed is supplied to the voice compression section 2.

The voice compression section 2 is constituted of, for example, a DSP, a CPU, a multiplexer and the like. The voice compression section 2 has also a storage medium drive for reading/writing data from/to a storage medium (e.g., CD-R).

Upon reception of the PCM signal to be compressed, the voice compression section 2 performs data compression by MP3, advanced audio coding (AAC) or another method. The upper limit frequency of a band occupied by data obtained by data compression (compression data described above) is a predetermined frequency or lower.

The voice compression section 2 generates external data indicating whether the PCM signal contains high frequency components, in accordance with whether the detection signal is supplied from the detector unit 12.

Specifically, upon reception of the detection signal from the detector unit 12, the voice compression section 2 generates synchronously with the detection signal the external data indicating that the PCM signal contains high frequency components. On the other hand, if the detection signal is not supplied synchronously with the supply of the PCM signal to be compressed, then the voice compression section 2 generates the external data indicating that the PCM signal does not contain high frequency components.

Figure 3:
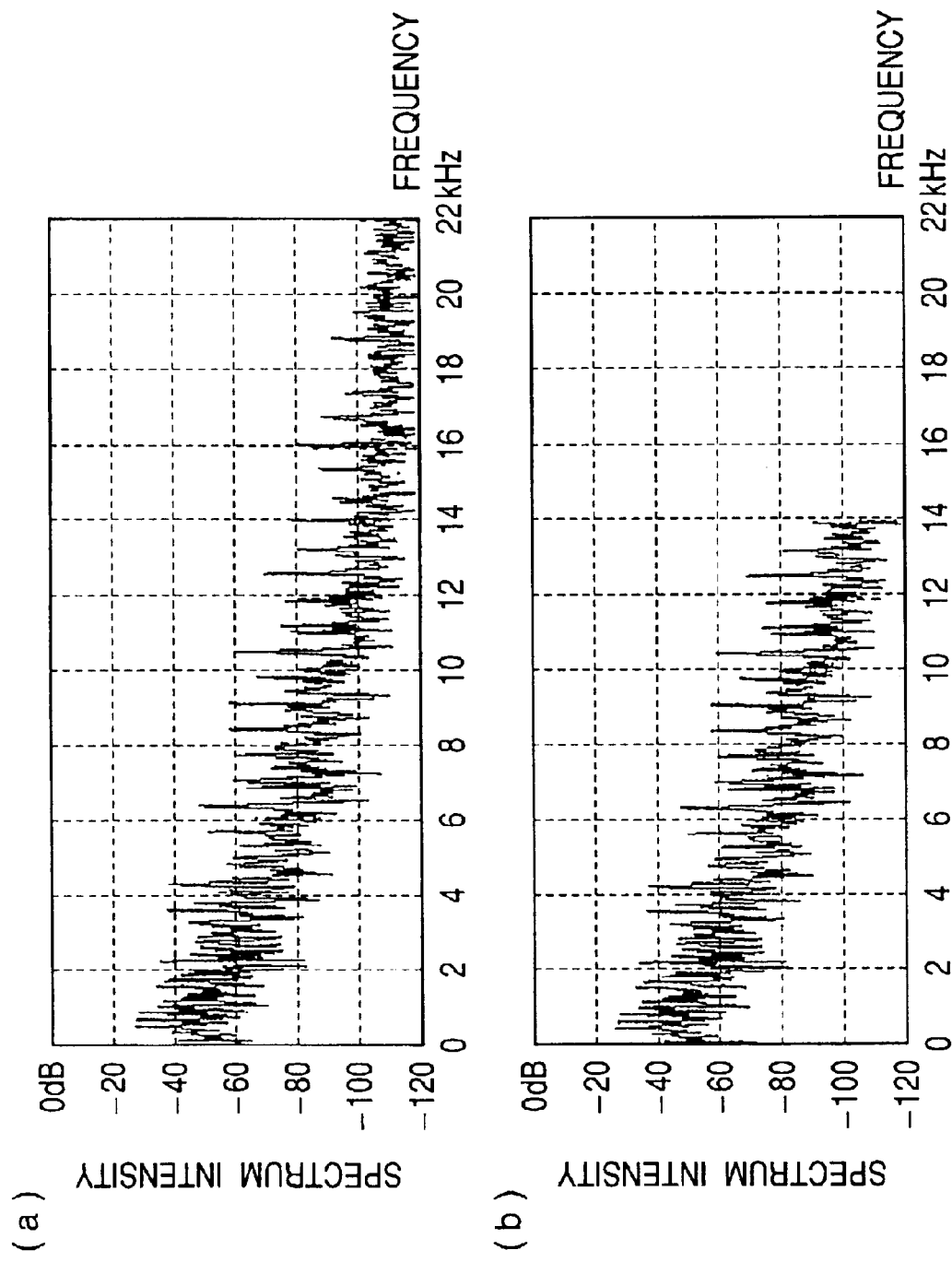
FIG. 3(a) is a diagram showing the spectrum of an original audio signal and FIG. 3(b) is a diagram showing the spectrum of the audio signal whose frequency components higher than a predetermined frequency were removed.

For example, the upper limit frequency of the band occupied by the compression data is about 14 kHz and the spectrum distribution of the PCM signal supplied to HPF 11 (and voice compression section 2) is such as shown in FIG. 3(*b*) (substantially no spectrum components at 14 kHz or higher), then the detector unit 12 generates the external data indicating that the PCM signal does not contain high frequency components.

The voice compression section 2 records the compression data of the PCM signal and the corresponding external data representative of whether the PCM signal contains high frequency components in an external storage medium set in the storage medium drive.

The voice compression section 2 may have a communication control apparatus constituted of a modem, a terminal adaptor or the like connected to an external communication line, instead of or in combination with the storage medium drive. In this case, the voice compression section 2 transfers, via the communication line to an external, the compression data of the PCM signal and the external data representative of a presence/absence of high frequency components of the PCM signal.

If the voice compression section 2 compresses the PCM signal in the MP3 format, the external data is included in unshellery code.

The voice decompression section 3 has, for example, a DSP, a CPU and the like as well as a storage medium drive. The voice decompression section 3 reads the compression data of the PCM signal compressed by MP3, AAC or another method and the corresponding external data from the external storage medium set in the storage medium drive. The read compression data is decompressed by MP3, AAC or another method to generate a PCM signal representative of decompression data. This PCM signal and the corresponding external data read from the storage medium are supplied to the frequency interpolating section 4 (more specifically, to an interpolation judging unit 41 to be described later).

The voice decompression section 3 may have a communication control apparatus instead of or in combination with the storage medium drive. In this case, the voice decompression section 3 receives the compression data along with the external data from an external via a communication line, decompresses the received compression data, and supplies the PCM signal representative of decompression data and the received external data to the frequency interpolating section 4.

Figure 7:
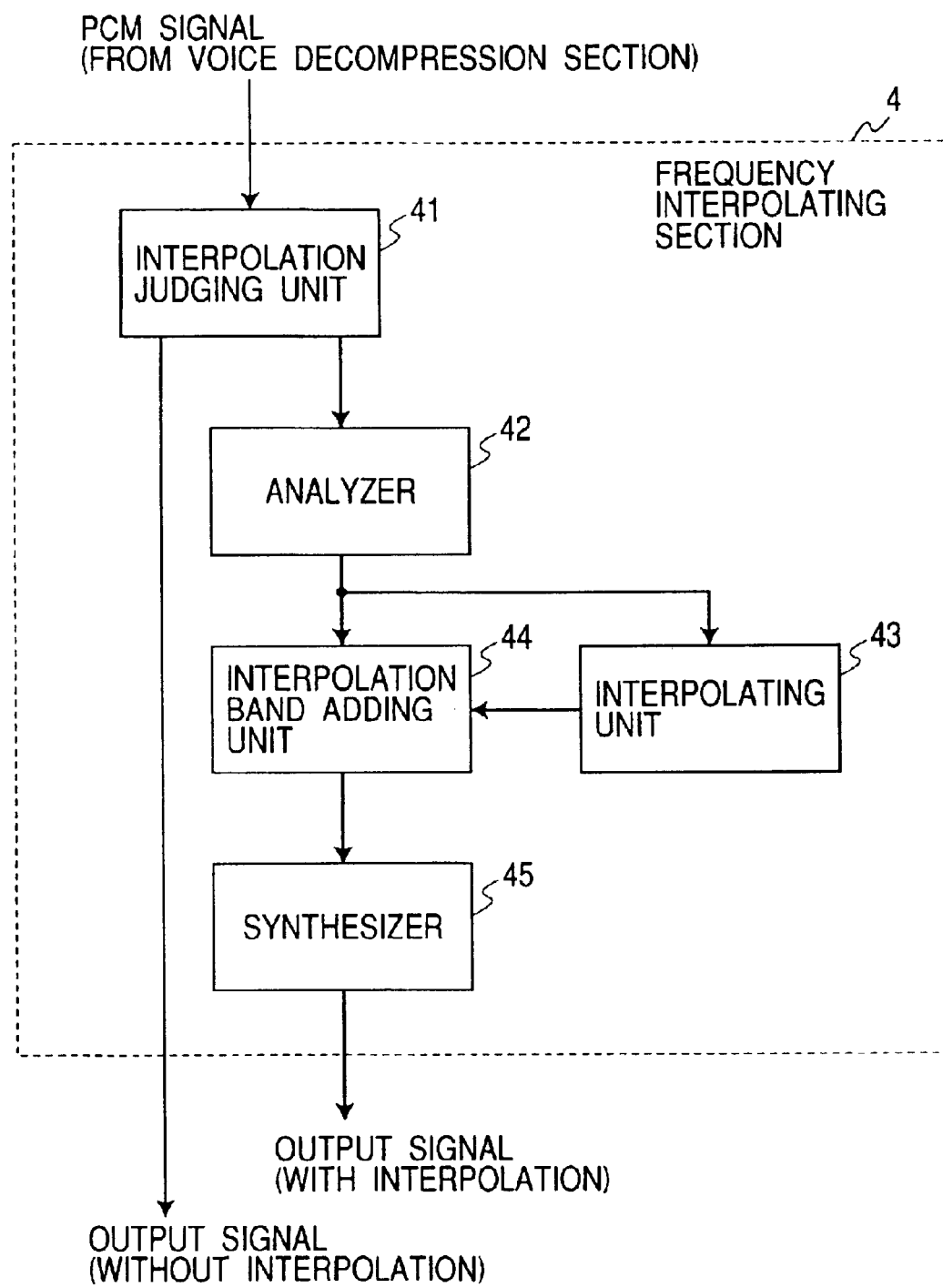
FIG. 7 is a diagram showing the structure of a frequency interpolating section shown in FIG. 6.

As shown in FIG. 7, the frequency interpolating section 4 is constituted of an interpolation judging unit 41, an analyzer 42, an interpolating unit 43, an interpolation band adding unit 44 and a synthesizer 45.

The interpolation judging unit 41 is made of, for example, a demultiplexer and the like. Upon reception of the PCM signal and corresponding external data from the voice decompression section 3, the interpolation judging unit 41 judges whether the external data indicates that the PCM signal contains high frequency components or not. If it is judged that the PCM signal contains high frequency components, the PCM signal supplied from the voice decompression section 3 is supplied to the analyzer 42.

If the interpolation judging unit 41 judges that the external data acquired from the voice decompression section 3 indicates that the PCM signal does not contain high frequency components, the PCM signal supplied from the voice decompression section 3 is output as a signal output from the frequency interpolating section 4.

The analyzer of the frequency interpolating section 4 shown in FIG. 7 has substantially the same structure as that of the analyzer shown in FIG. 2 and performs substantially the same process as that of the analyzer shown in FIG. 2. Therefore, the analyzer of the frequency interpolating section 4 shown in FIG. 7 generates (n+1) signals representative of the spectrum distributions of (n+1) bands each having the same band width as that obtained by dividing the spectrum distribution of the supplied decompression data by (n+1), and supplies them to the interpolating unit of the frequency interpolating section 4.

The synthesizer of the frequency interpolating section 4 shown in FIG. 7 has substantially the same structure as that of the synthesize shown in FIG. 5 and performs substantially the same process as that of the synthesizer shown in FIG. 5. Therefore, the synthesizer sequentially outputs the PCM signal having a spectrum distribution corresponding to the spectrum distribution after interpolation, at substantially the same period as that of the PCM signal supplied to the analyzer of the frequency interpolating section 4.

Of the spectrum after interpolation, the spectrum of the interpolation band added by the interpolation band adding unit of the frequency interpolating section 4 has a spectrum distribution corresponding to the spectrum distribution of the reference band contained in the combination of the reference band with the highest spectrum distribution correlation coefficient and the comparison band.

(Third Embodiment)

Figure 8:
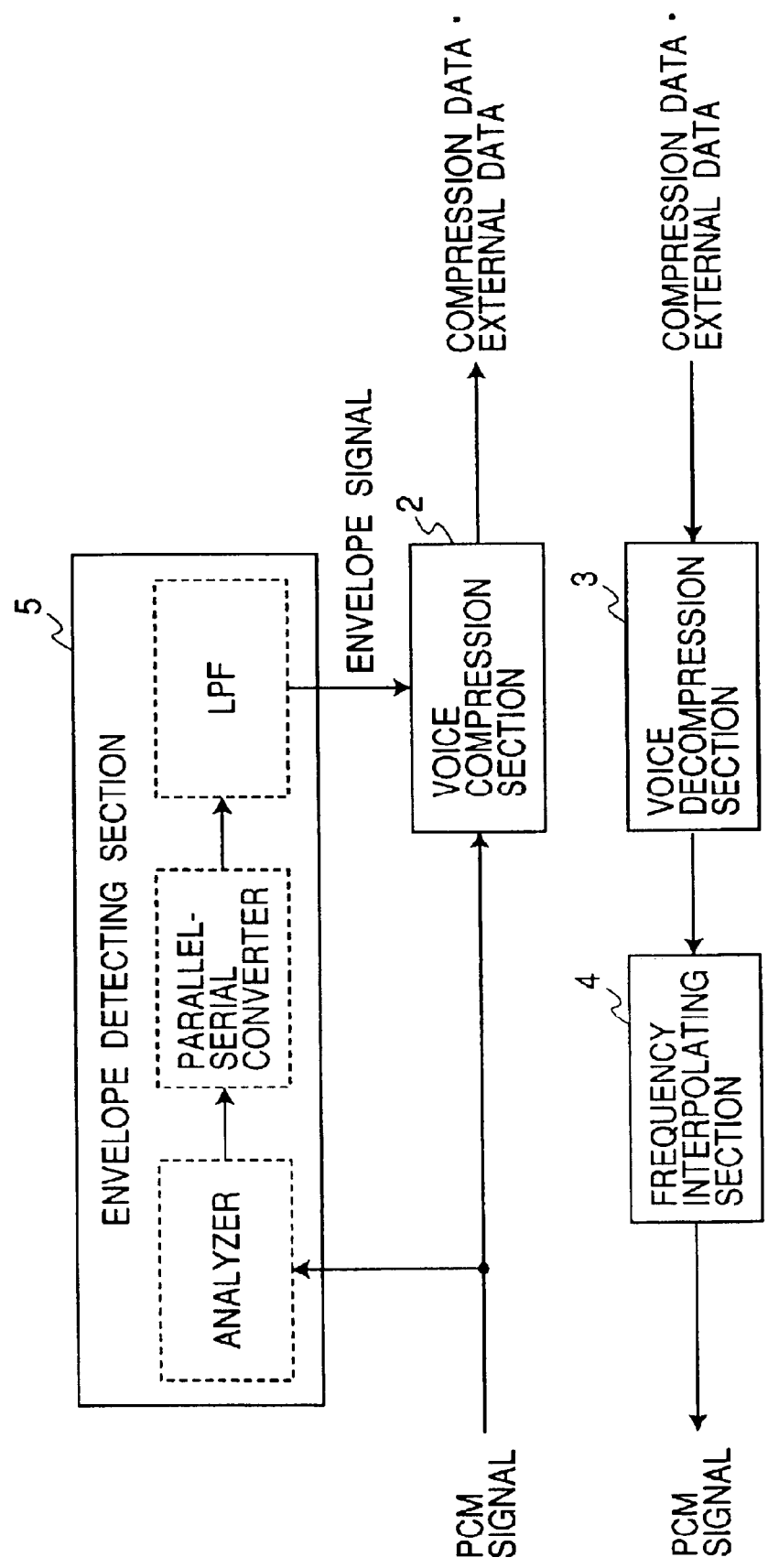
FIG. 8 is a diagram showing the structure of a frequency interpolating device according to a third embodiment of the invention.

FIG. 8 is a diagram showing the structure of a frequency interpolating device according to a third embodiment of the invention.

As shown, the frequency interpolating device has substantially the same structure as that of the frequency interpolating device of the second embodiment shown in FIG. 6, excepting that an envelope detecting unit 5 is used in place of the high frequency component detecting unit 1 and that the frequency interpolating section 4 does not have the interpolation judging unit 41. Similar to the frequency interpolating section 4 shown in FIG. 6, the frequency interpolating section 4 shown in FIG. 8 has an analyzer, an interpolating unit, an interpolation band adding unit and a synthesizer. The operation of each component of the frequency interpolating device of this embodiment is different from that of the frequency interpolating device shown in FIG. 6.

The envelope detecting section 5 has, for example, an analyzer, a parallel-serial converter and a low pass filter (LPF), the analyzer having substantially the same structure as that of the analyzer 41 of the frequency interpolating section 4.

The analyzer of the envelope detecting section 5 receives a PCM signal to be compressed, generates a predetermined number of signals representative of the spectrum distribution of the PCM signal, and supplies the generated signals to the parallel-serial converter of the envelope detecting section 5. The PCM signal to be compressed is also supplied to the voice compression section 2.

Upon reception of the signals representative of the spectrum distribution of the PCM signal to be compressed from the analyzer of the envelope detecting section 5, the parallel-serial converter of the envelope detecting section 5 sequentially supplies these signals to LPF of the envelope detecting section 5 in the order of lower frequency band (or in the order of higher frequency band).

Upon sequential reception of the signals representative of the spectrum distribution of the PCM signal to be compressed from the parallel-serial converter of the envelope detecting section 5, LPF of the envelope detecting section 5 cuts the frequency components of the signals at the cut-off frequency or higher and supplies the other frequency components (lower frequency components) to the voice compression section 2. The low frequency components supplied from LPF of the envelope detecting section 5 to the voice compression section 2 correspond to an envelope signal of the spectrum distribution of the PCM signal to be compressed.

Instead of generating the external data depending upon whether the detection signal is supplied from the detector unit 12 shown in FIG. 6, the voice compression section 2 shown in FIG. 8 uses as the external data the signal representative of the low frequency components supplied from the envelope detecting section 5 (an envelope signal of the spectrum distribution of the PCM signal to be compressed).

The voice compression section 2 stores the compression data and the corresponding external data representative of the envelope of the spectrum distribution of the PCM signal before compression in an external storage medium set in a storage medium drive. Alternatively, the compression data and external data are transferred to an external via a communication line.

The voice decompression section 3 shown in FIG. 8 acquires the compression data of the PCM signal compressed by MP3, AAC or another method and the corresponding external data from the external storage medium or from the external via the communication line. Similar to the voice decompression section 3 shown in FIG. 6, the voice decompression section 3 shown in FIG. 8 decompresses the acquired compression data by MP3, AAC or another method, and supplies a PCM signal representative of decompression data to the analyzer of the frequency interpolating section 4. The acquired external data is supplied to the interpolation band adding unit of the frequency interpolating section 4.

The analyzer of the frequency interpolating section 4 shown in FIG. 8 has substantially the same structure as that of the analyzer shown in FIG. 2 and performs substantially the same process as that of the analyzer shown in FIG. 2. Therefore, the analyzer of the frequency interpolating section 4 shown in FIG. 8 generates (n+1) signals representative of the spectrum distributions of (n+1) bands each having the same band width as that obtained by dividing the spectrum distribution of the supplied decompression data by (n+1), and supplies them to the interpolating unit of the frequency interpolating section 4.

The interpolating unit of the frequency interpolating section 4 shown in FIG. 8 has substantially the same structure as that of the interpolating unit 43 shown in FIG. 7 and performs substantially the same process as that of the interpolating unit 43 shown in FIG. 7 to determine the reference band and supply the information of the determined reference band to the interpolation band adding unit of the frequency interpolating section 4.

Similar to the interpolation band adding unit 44 of the frequency interpolating section 4 shown in FIG. 7, the interpolation band adding unit of the frequency interpolating section 4 shown in FIG. 8 is constituted of a DSP, a CPU and the like. Upon reception of the (n+1) signals representative of the spectrum distributions of the (n+1) bands from the analyzer of the frequency interpolating section 4 and the external data from the voice decompression section 3, the interpolation band adding unit of the frequency interpolating section 4 shown in FIG. 8 performs substantially the same process as that of the interpolation band adding unit 44 shown in FIG. 7 to supply the signal representative of the spectrum distribution after interpolation to the synthesizer of the frequency interpolating section 4.

In this case, instead of performing regression calculations by identifying the function of the envelope of the spectrum distribution of each band in accordance with the signal supplied from the analyzer of the frequency interpolating section 4, the interpolation band adding unit of the frequency interpolating section 4 shown in FIG. 8 calculates an estimate value of a mean square value of the spectrum components contained in the interpolation band in accordance with the function of the envelope represented by the supplied external data.

The synthesizer of the frequency interpolating section 4 shown in FIG. 8 has substantially the same structure as that of the synthesize shown in FIG. 5 and performs substantially the same process as that of the synthesizer shown in FIG. 5. Therefore, the synthesizer sequentially outputs the PCM signal having a spectrum distribution corresponding to the spectrum distribution after interpolation at substantially the same period as that of the PCM signal supplied to the analyzer of the frequency interpolating section 4.

Of the spectrum after interpolation, the spectrum of the interpolation band added by the interpolation band adding unit of the frequency interpolating section 4 has a spectrum distribution corresponding to the spectrum distribution with the highest spectrum distribution correlation coefficient of the reference band contained in the combination of the reference band and comparison band.

The structure of the frequency interpolating device is not limited only to that described above.

For example, at least some functions of the analyzer, parallel-serial converter and LPF of the envelope detecting section 5 may be performed by DSP or CPU, or the whole function of the envelope detecting section 5 may be performed by DSP and CPU. The analyzer of the envelope detection section 5 may be realized by a fast Fourier transform (FFT) device having a well-known structure.

Instead of generating an envelope signal of the spectrum distribution of the PCM signal to be compressed, the envelope detecting section 5 may generate a signal representative of a band width occupied by the PCM signal to be compressed. In this case, the voice compression section 2 may use as the external data the data representative of the band width occupied by the spectrum distribution of the PCM signal before compression. For example, the data representative of the occupied band width is constituted of the lowest frequency of the spectrum components of the PCM signal and the data representative of the band width occupied by the PCM signal. If the lowest frequency of the spectrum components of the PCM signal is already known (e.g., 0 Hz), it is sufficient if the data representative of the occupied band width is constituted of only the data representative of the band width occupied by the PCM signal.

If the external data represents the band width occupied by the spectrum distribution of the PCM signal before compression, similar to the interpolation band adding unit 44 of the second embodiment, the interpolation band adding unit of the frequency interpolating section 4 calculates the estimate value of a mean square value of the spectrum components essentially contained in the interpolation band, by performing regression calculations after identifying the function of the envelope of the spectrum distribution of each band in accordance with the signals supplied from the analyzer of the frequency interpolating section 4. In this case, assuming that of the interpolation bands, the band out of the occupied band width represented by the external data has essentially no spectrum components, the estimate value of a mean square value of the spectrum components essentially contained in the interpolation band is calculated.

The frequency interpolating device of the second and third embodiments of the invention described above can effectively achieve the second object of the invention.

INDUSTRIAL APPLICABILITY

As described so far, according to the invention, a frequency interpolating device and method can be realized which can recover a signal approximate to an original signal from a modulation wave of a signal having a limited band of the original signal, and more particularly can recover an audio signal with a high quality.

According to the invention, a frequency interpolating device and method can be realized which can properly recover a signal approximate to an original signal from either an original signal with the spectrum components in some bands being suppressed or a signal representative of an original signal containing no spectrum components in the bands or from a signal combining these two signals.

What is claimed is:

1. A frequency interpolating device for receiving an input signal of an original signal whose frequency components in a particular frequency band are suppressed, approximately recovering suppressed frequency components and reproducing a signal approximate to the original signal, characterized in that short period spectra are obtained from a frequency band having frequency components not suppressed; a short period spectrum in the suppressed frequency band are estimated by paying attention to repetition of a spectrum pattern at a predetermined frequency interval; and in accordance with this estimation, a signal containing the frequency components in the suppressed frequency band is synthesized and added to the input signal.

2. The frequency interpolating device according to claim 1, wherein the repetition of the spectrum pattern is judged by calculating a correlation coefficient between a spectrum pattern in a first frequency band having a predetermined band width and frequency components not suppressed near the suppressed frequency band and a spectrum pattern in a second frequency band adjacent to the first frequency band having the predetermined band width, and the suppressed frequency components are synthesized by coupling a unit of repetitive spectrum patterns.

3. The frequency interpolating device according to claim 2, wherein if the spectrum pattern in the first frequency band and the spectrum pattern in the second frequency band have a high correlation coefficient, the spectrum pattern is extended to the suppressed band to synthesize the frequency components of the suppressed band.

4. The frequency interpolating device according to claim 3, wherein the intensities of the frequency components to be synthesized are determined from a spectrum envelope of the suppressed frequency band estimated from a spectrum envelope of the frequency band not suppressed.

5. The frequency interpolating device according to claim 1, wherein the particular frequency band is a high frequency band.

6. The frequency interpolating device according to claim 5, wherein an upper limit frequency of the first or second frequency band is a lower limit frequency of a suppressed high frequency band.

7. The frequency interpolating device for processing an input signal whose frequency components in a particular frequency band are suppressed and reproducing a signal having the suppressed frequency band components approximately recovered, said device comprising:

spectrum generating means for generating short period spectra of the input signal;

spectrum pattern deriving means for deriving correlation spectrum patterns having a correlation between short period spectrum patterns in adjacent frequency bands having the same band width;

spectrum envelope deriving means for deriving spectrum envelope information in the band whose frequency components are not suppressed;

means responsive to both said spectrum pattern deriving means and said spectrum envelope deriving means for synthesizing a signal having frequency components in the suppressed frequency band; and means for adding the synthesized signal having frequency components in the suppressed frequency band to the input signal.

8. The frequency interpolating device according to claim 7, wherein the signal having frequency components in the suppressed frequency band has the derived correlation spectrum pattern and an intensity determined by the spectrum envelope information.

9. The frequency interpolating device according to any one of claims 1 to 8, wherein the input signal is a PCM signal obtained by sampling and quantizing an analog audio signal.

10. A frequency interpolating method of receiving an input signal of an original signal whose frequency components in a particular frequency band are suppressed, approximately recovering suppressed frequency components and reproducing a signal approximate to the original signal, characterized in that
short period spectra are obtained from a frequency band having frequency components not suppressed; a short period spectrum in the suppressed frequency band is estimated by paying attention to repetition of a spectrum pattern at a predetermined frequency interval; and in accordance with this estimation, a signal containing the frequency components in the suppressed frequency band is synthesized and added to the input signal.

11. The frequency interpolating method according to claim 10, wherein the repetition of the short period spectrum pattern is judged in accordance with a correlation coefficient between a spectrum pattern in a first frequency band having a predetermined band width and frequency components not suppressed near the suppressed frequency band and a spectrum pattern in a second frequency band adjacent to the first frequency band having the predetermined band width.

12. A frequency interpolating method of processing an input signal whose frequency components in a particular frequency band was suppressed and reproducing a signal having the suppressed frequency band components approximately recovered, said method comprising the steps of:
generating short period spectra of the input signal;
deriving correlation spectrum patterns having a correlation between adjacent short period spectrum patterns in frequency bands having a same band width;
deriving spectrum envelope information in the frequency band not suppressed;
a step of responding to said spectrum pattern deriving step and said spectrum envelope driving step and synthesizing a signal having frequency components in the suppressed frequency band; and
a step of adding the synthesized signal having frequency components in the suppressed frequency band to the input signal.

13. A frequency interpolating system for receiving an input signal of an original signal whose frequency components in a particular frequency band was suppressed, approximately recovering suppressed frequency components and reproducing a signal approximate to the original signal, said system comprising:
means for deciding whether the particular frequency band of the original signal contains frequency components having a predetermined level or higher and generating identification data indicative of a presence/absence of the frequency components having the predetermined level or higher;
signal conversion means for suppressing the frequency components of the original signal in the particular frequency band and subjecting the original signal to a predetermined signal conversion process;
means for superposing the identification data upon the converted signal to transmit the identification data and the converted data;
deciding means for receiving the transmitted signal, checking the identification data contained in the received signal, and deciding a presence/absence of the frequency components in the particular frequency band;
control means for controlling to input the received signal to succeeding signal processing means only if said deciding means judges that the particular frequency band contains the frequency components; and
signal processing means responsive to the received signal from said control means for performing an inverse conversion process of the predetermined signal conversion process and an interpolation process of approximately synthesizing and adding the frequency components in the suppressed frequency band.

14. The frequency interpolating system according to claim 13, wherein the predetermined signal conversion process is a data compression process and the inverse conversion process to be executed by said signal processing means is a data decompression process.

15. The frequency interpolating system according to claim 13, wherein the interpolation process to be executed by said signal processing means includes a short period spectrum analysis process, a process of deriving short period spectrum patterns in adjacent frequency bands having a correlation, and a process of deriving spectrum envelope information.

16. A frequency interpolating device for receiving an input signal of an original signal whose frequency components in a particular frequency band are suppressed, approximately recovering suppressed frequency components and reproducing a signal approximate to the original signal, said device comprising:
means for receiving a first signal obtained by subjecting the original signal whose signal components in the particular frequency band were suppressed to a predetermined signal conversion process and a second signal superposed upon the first signal of identification data representative of whether the particular frequency band of the original signal contains the frequency components having a predetermined level or higher;
deciding means for checking the identification data contained in the received signal and judging a presence/absence of the frequency components in the particular frequency band;
control means for controlling to input the received signal to succeeding signal processing means only if said deciding means decide that the particular frequency band contains the frequency components; and
signal processing means responsive to the received signal from said control means for performing an inverse conversion process of the predetermined signal conversion process and an interpolation process of approximately synthesizing and adding the frequency components in the suppressed frequency band.

17. The frequency interpolating device according to claim 16, wherein the predetermined signal conversion process is a data compression process and the inverse conversion process to be executed by said signal processing means is a data decompression process.

18. The frequency interpolating device according to claim 16, wherein the interpolation process to be executed by said signal processing means includes a short period spectrum analysis process, a process of deriving short period spectrum patterns in adjacent frequency bands having a correlation, and a process of deriving spectrum envelope information.

19. A frequency interpolating method of receiving an input signal of an original signal whose frequency components in a particular frequency band are suppressed, approximately recovering suppressed frequency components and reproducing a signal approximate to the original signal, said method comprising the steps of:
deciding whether the particular frequency band of the original signal contains frequency components having a predetermined level or higher and generating identification data representative of a presence/absence of the frequency components having the predetermined level or higher;

suppressing the frequency components of the original signal in the particular frequency band and subjecting the original signal to a predetermined signal conversion process;

superposing the identification data upon the converted signal and transmitting the identification data and the converted data;

receiving the transmitted signal, checking the identification data contained in the received signal, and deciding a presence/absence of the frequency components in the particular frequency band;

controlling to input the received signal to a succeeding signal processing step only if said judging step deciding decides that the particular frequency band contains the frequency components; and responsive to the received signal from said control step, performing an inverse conversion process of the predetermined signal conversion process and an interpolation process of approximately synthesizing and adding the frequency components in the suppressed frequency band.

20. A frequency interpolating method of receiving an input signal of an original signal whose frequency components in a particular frequency band are suppressed, approximately recovering suppressed frequency components and reproducing a signal approximate to the original signal, said method comprising the steps of:

receiving a first signal obtained by subjecting the original signal whose signal components in the particular frequency band were suppressed to a predetermined signal conversion process and a second signal superposed upon the first signal of identification data representative of whether the particular frequency band of the original signal contains the frequency components having a predetermined level or higher;

checking the identification data contained in the received signal and deciding a presence/absence of the frequency components in the particular frequency band;

controlling to supplying the received signal to a succeeding signal processing step only if said deciding step decides that the particular frequency band contains the frequency components; and responsive to the received signal from said controlling step, performing an inverse conversion process of the predetermined signal conversion process and an interpolation process of approximately synthesizing and adding the frequency components in the suppressed frequency band.

* * * * *